Figures 1, 2:
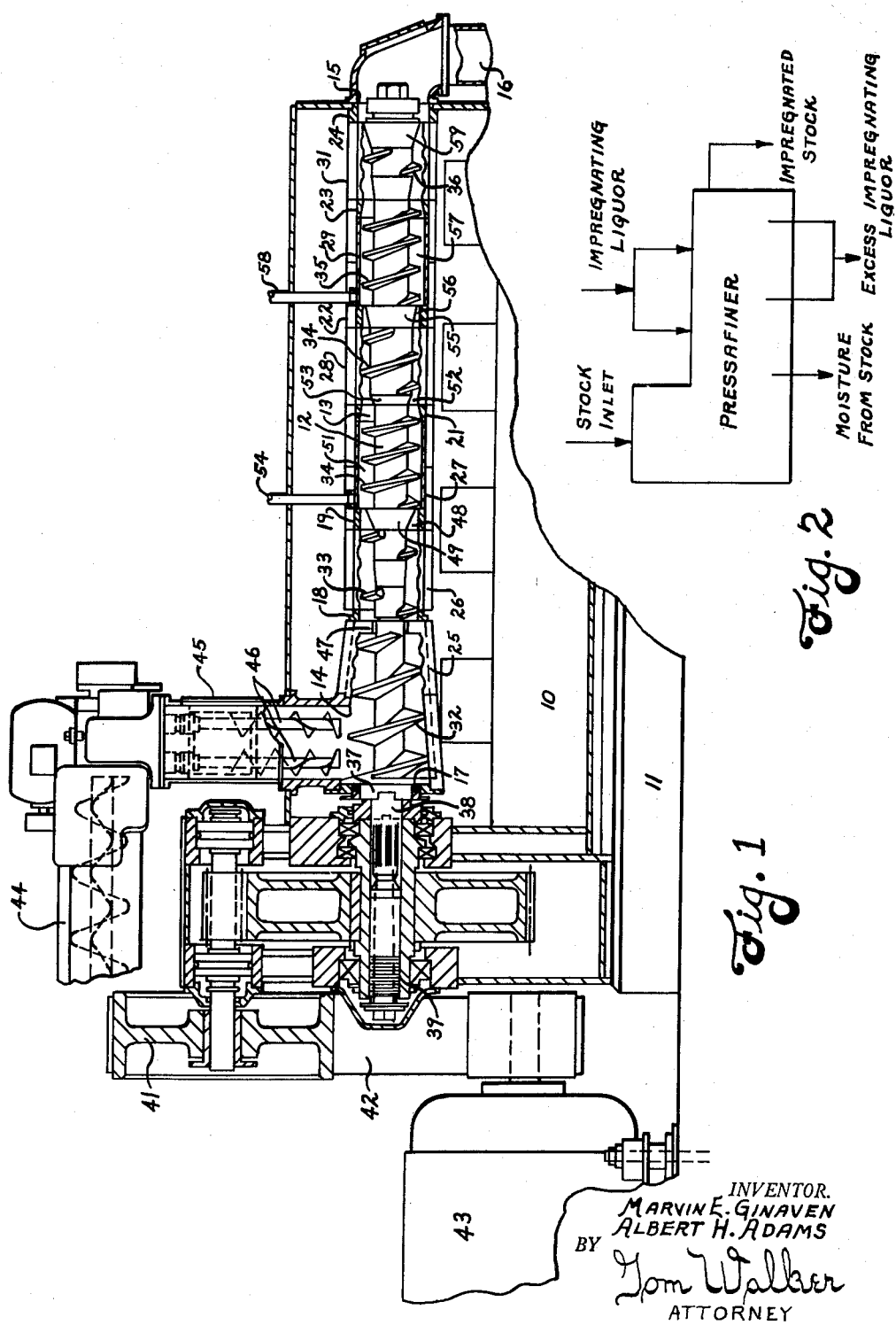

March 14, 1961

M. E. GINAVEN ET AL 2,975,096

IMPREGNATION OF WOOD CHIPS

Filed Nov. 18, 1957

2 Sheets-Sheet 1

INVENTOR.
MARVIN E. GINAVEN
ALBERT H. ADAMS
BY Tom Walker
ATTORNEY

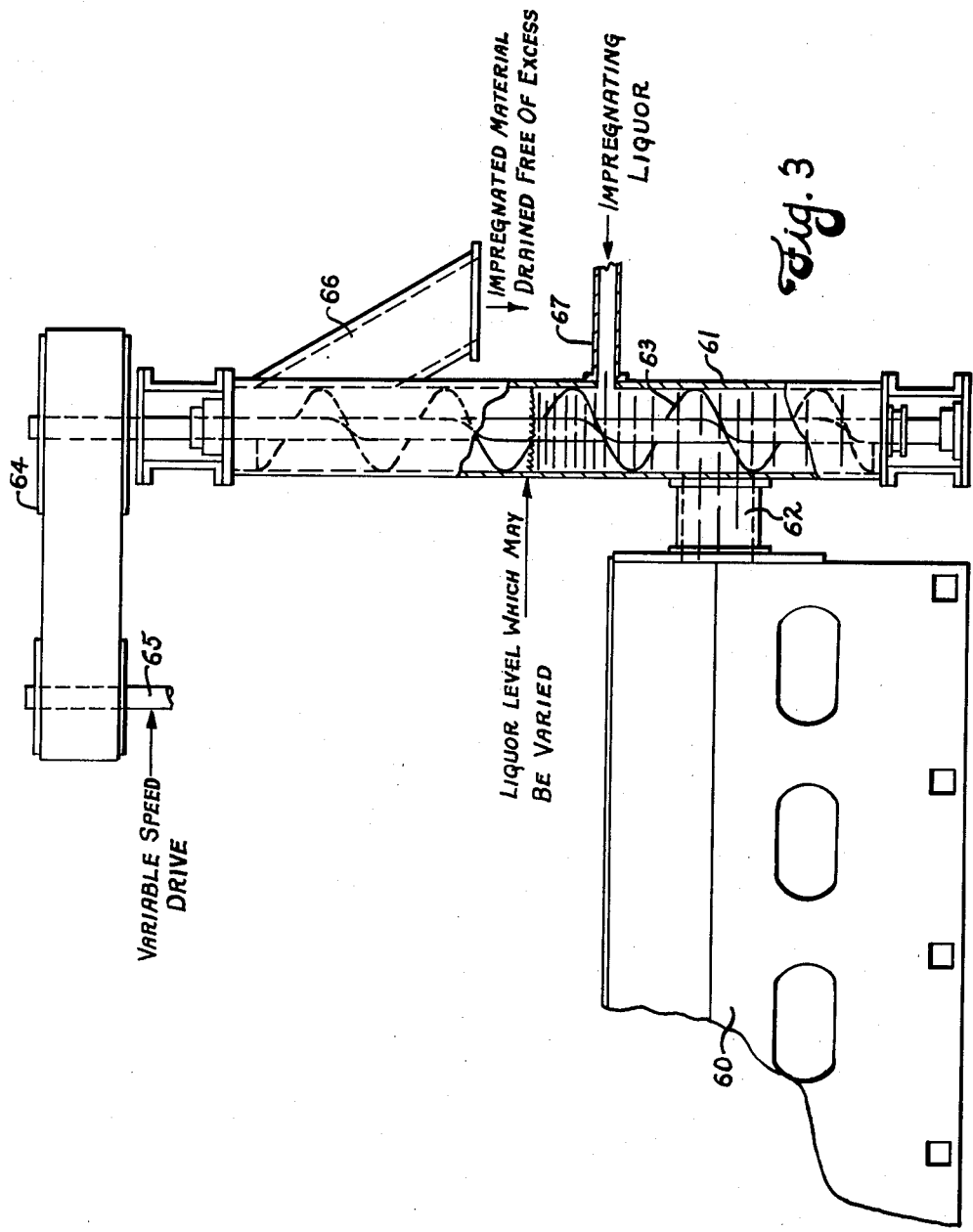

United States Patent Office 2,975,096
Patented Mar. 14, 1961

2,975,096

IMPREGNATION OF WOOD CHIPS

Marvin E. Ginaven and Albert H. Adams, Springfield, Ohio, assignors to The Bauer Brothers Co., Springfield, Ohio, a corporation of Ohio Filed Nov. 18, 1957, Ser. No. 697,133

12 Claims. (Cl. 162—18)

This invention relates to the production of pulp material from wood chips and like cellular plant stock, and particularly to a generally new method of and apparatus for introducing into the cells and voids of such stock an impregnating material, such as a cooking liquor.

The object of the invention is to simplify the construction as well as the means and mode of operation of impregnation apparatus, whereby such apparatus may not only be economically manufactured, but will be more efficient and satisfactory in use, adaptable to a wide variety of applications, and be unlikely to get out of order.

A further object of the invention is to obviate the need for, or substantially to reduce the need for, cookers or digesters as known presently in the art wherein partly reduced plant stock is confined in a pressure vessel and there made subject to the relatively slow penetration of cooking liquors also held within the vessel.

Another object of the invention is to enable substantially continuous impregnation of a moving column of plant stock, utilizing feed screw means, in which the advancing plant material is subjected to cutting and shearing operations for a further reduction thereof and to expose a greater surface area thereof, further is compressed to remove or exhaust air and liquids therefrom and, is bathed in an impregnating material.

A further object of the invention is to make use of the compressive forces generated in a screw press or the like to prepare the stock material to receive the impregnating material and to enable a quick and thorough penetration of the stock by such material through a substantial exclusion of air from the place of exposure of the stock to the impregnating material.

It is still another and specific object of the invention to use a screw press as a device to impregnate plant stock with cooking liquor.

A further object of the invention is to provide an impregnation apparatus and method possessing the advantageous structural features, the inherent meritorious characteristics and the mode of operation herein mentioned.

With the above and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

Referring to the accompanying drawing wherein is shown one but obviously not necessarily the only form of embodiment of the invention, Fig. 1 is a view generally in side elevation, with some parts removed, of one illustrated embodiment of the invention, portions of this view being diagrammatic in form;

Fig. 2 is a diagram showing the route of the plant stock through the apparatus of Fig. 1 together with points of introduction and removal of fluids put into and removed from the moving stock; and Fig. 3 is a view similar to Fig. 1, showing a second illustrated embodiment of the invention.

Like parts are indicated by similar characters of reference throughout the several views.

Referring to the drawings, there is shown in Fig. 1 a screw press 10 essentially of a kind heretofore known to shear and to compress plant stock prior to or in lieu of refining thereof. In accordance with the instant inventive concept, the screw press is modified to provide for introduction of the cooking liquors into the stock as a part of its passage through the screw press, thereby obviating the need for preliminary cooking.

The press comprises a main body 11 providing a mounting for a screw shaft 12 longitudinally disposed in a through chamber 13 having at its one end an inlet opening 14 for the stock to be treated and at the other end thereof an outlet opening 15 for the treated stock, the latter being conducted away from the press by a duct 16 or the like. The chamber 13 may more particularly be considered as defined by an end closure 17 and a plurality of longitudinally spaced apart cylindrical fittings 18, 19, 21, 22, 23 and 24. Between the end closure 17 and the fitting 18 is a circumferential series of screen bars 25 which serve to confine the stock within the chamber 13 but permit an escape of fluids, air and liquid, therefrom. The fittings 18 and 19 similarly are interconnected by screen bars 26. Extending between the fitting 19 and the fitting 21 is a closed cylinder 27. Screen bars 28 extend between the fitting 21 and the fitting 22, while a closed cylinder 29 interconnects the fitting 22 and the fitting 23. Screen bars 31 interconnect the fitting 23 and the fitting 24, which latter is located at and defines the stock discharge opening 15.

To advance material through the chamber 13 from the inlet 14 to the outlet 15, there is provided on the surface of the shaft 12 a combination of helical worms or teeth designed to produce movement of the material at varying speeds. At what may be considered to be the inlet end of the chamber, the shaft 12 is formed with a relatively wide diameter, short pitch worm 32 designed to pick up relatively large quantities of introduced stock and move it at relatively slow speed into the further reaches of the chamber 13. Between the fittings 18 and 19 and between the fittings 21 and 22, the shaft 12 has similar worms 33 and 34 designed for relatively slow advance of the stock material. Within or between the fittings 19 and 21, and between the fittings 22 and 23 are relatively greater pitch worms 34 and 35 producing a more rapid movement of the material at these points. Adjacent to the outlet 15, a final worm formation 36 discharges the stock material out of the chamber 13 into the duct 16.

In use, the shaft 12 is rotated. One end thereof is formed with a clutch portion 37 having a bearing in the end plate 17 and engageable by a complementary clutch portion 38 on an intermediate driving shaft 39. The latter is rotated or rotatable by means including a belt pulley 41, a belt 42 and an electric motor 43, so that upon energizing of the motor 43 a positive rotary driving force may be imparted to the shaft 12.

Wood chips, agricultural residues or like compressible materials are brought to the screw press in any convenient manner, as for example by a feed screw means 44 discharging into a hopper 45. The latter is aligned with and communicates at its bottom with inlet opening 14 of the screw press, and may include individual feed screws 46 to insure a steady flow of the plant stock into the press.

Within the chamber 13, immediately beneath opening 14, the incoming plant stock is picked up by the worm 32 and advanced toward the discharge end 15 of the chamber. The bars 25 at this point define a gradually reducing area of the chamber 13 with the result that a progressive compressive force is applied to the material advanced by the worm 32, the air contained therein and liquids contained therein being gradually exhausted or expelled and passing out of the press between the bars 25. Also, the bars 25, and the other bars along the length of the chamber 13, may be formed with inwardly projecting abutments 47 which, as the stock material is forced longitudinally and rotatively thereby exert a cutting and shearing action upon the stock, further reducing it to its fibrous components and in so doing exposing a greater surface for the subsequent application of impregnating material. Squeezed nearly dry and torn by the internal projections 47, the stock material reaches a point of maximum applied compression at a point 48 defined by the fitting 19 and a conical formation 49 on the shaft 12. Beyond the high pressure point 48 is an area of low pressure defined by a chamber 51 enclosed by the cylinder 27 and containing the relatively high pitch worm 34. Beyond the chamber 51, the advancing material encounters another high pressure point 52 defined by a conical formation 53 on the shaft, at or immediately beyond the fitting 21. Communicating with the low pressure chamber 51 is a pipe 54 leading from a source of cooking liquor.

As the plant stock material is advanced by the worm formations on the rotating shaft 12, air is exhausted gradually as the stock is conveyed toward point 48, where maximum pressure is developed. Upon approaching the point 48, liquids will be expressed from wet materials and both the liquid and expressed air will be released by way of the described screen bar openings. The wave line type of screen bar as here illustrated provides projections into the chamber 13 for a maximum fiberizing of the stock material. As the stock passes over the conical formation 49 it is tightly compressed. A plug seal thereby is formed at this point excluding air from the chamber 51 at this end thereof. In the continuous operation of the machine, it will be understood that a similar plug is formed at point 52 so that air is excluded from the chamber 51 at both ends thereof. As the stock material is extruded beyond the point 48 and into the chamber 51 it is free to expand on account of the larger volume of chamber 51, this action being facilitated by an increase in the rate at which the stock is propelled forward due to the increased pitch on the conveying worms. The mass into which the stock has been compacted by the high compressive force at point 48 accordingly is materially reduced in the region of low pressure. Into this region of low pressure, an impregnating material is introduced by way of the pipe 54, the rate of injection or flow being controlled in a suitable manner by pumps, meters or the like. The cells and voids of the plant fibers, which open wide under the freedom of expansion permitted in the chamber 51, are thus quickly and easily penetrated and filled by the impregnating material which has sole access to the fibers, air being substantially excluded from the chamber 51 as before indicated by plugs formed at the points 48 and 52.

Any excess of liquor or impregnating material can be removed by the pressing action which occurs from the point 52 to the discharge end. In accordance with the illustrated embodiment of the invention, however, there is interposed between the point 52 and the discharge opening 15 a second impregnating stage. Thus, beyond the conical formation 53, the shaft 12 is formed with a further conical formation 55 defining with the fitting 22 a high pressure point 56. Thus, impregnated stock reaching high pressure point 56 has the air and liquors largely expelled therefrom and is discharged into a chamber 57 as defined by the cylinder 29, in a relatively dry, deaerated condition. As it expands therein it is again wetted by an impregnating material supplied through a pipe 58. As indicated in Fig. 2, the pipes 54 and 58 may be jointly supplied from a common source of impregnating liquor. A conical formation 59 on the end of shaft 12, is effective to remove excess liquors which escape by way of the bars 31 and the treated stock material finally is discharged from the press into duct 16.

In the modified form of the invention shown in Fig. 3, a screw press 60 is provided which is generally conventional in form, that is, it is like the press of Fig. 1 except for the omission of means to introduce an impregnating agent into the stock material while it is between the ends of the feed screw. In this instance, the impregnating agent or liquor is contained within a tank 61. The discharge end of the press is connected to the tank 61, at a point beneath the normal level of the impregnating agent within the tank, by a connector 62 constructed to communicate the discharge end of the press with the tank interior in a fluid tight manner. The connector 62 serves as an expansion chamber, receiving the plant stock immediately following its extrusion past a high pressure point, as for example the high pressure point defined by conical portion 59 at the discharge end of the press of Fig. 1. Within the chamber 62, the stock expands where it is immersed in and wetted by the impregnating material therein. Access of air to the compressed and expanding stock is substantially excluded, it may be noted, as in the case of the embodiment of Fig. 1.

The tank 61 is constructed as a vertical housing for a feed screw 63 which is continuously rotated in a suitable manner, as by a belt and pulley mechanism 64 driven from a shaft 65. A gravity discharge outlet 66 communicates with the interior of the tank 61, above the normal level of the impregnating liquid. In the operation of the device, therefore, the plant stock is discharged into the tank 61 beneath the liquid level therein, is impregnated by such liquid and is carried by the feed screw 63 upward above the liquid level substantially to the top of the tank where it drops off the feed screw and out of the tank by way of the outlet 66. It will be understood that above the liquid level, the stock material conveyed by the screw 63 drains so that the stock as discharged from outlet 66 is substantially free of excess liquid. A continuing supply of impregnating liquor may be supplied to the tank 61, as through an inlet pipe 67.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect, and the invention is therefore claimed in any of its forms or modifications within the legitimate and valid scope of the appended claims.

Having thus described our invention, we claim:

1. A method of impregnating cellular plant stock, including the steps of applying shearing forces to the plant stock to increase the amount of exposed surface thereof, subjecting the plant stock to progressively applied compression to exhaust the air therefrom and to express liquids therefrom, releasing the applied compressive forces suddenly from a maximum applied value, and immediately upon release of the compressive forces bathing the plant stock in an impregnating liquid.

2. A method of continuous impregnating of cellular plant stock, including the steps of putting partly reduced stock through a feed screw, applying a compressive force to such stock while it is advanced by said screw to remove air and liquid therefrom, releasing the applied pressure from the stock under conditions substantially excluding air from the expanding stock, and while continuing to exclude air therefrom discharging the expanded stock into a bath of impregnating material beneath the surface thereof.

3. A method of continuous impregnating of cellular plant stock including the steps of putting partly reduced stock through a feed screw, applying a compressive force to such stock while it is advanced by said screw to remove air and liquid therefrom, releasing the applied pressure from the stock under conditions substantially excluding air from the expanding stock, while continuing to exclude air therefrom supplying to the voids in the expanding stock an impregnating material, and subjecting the impregnated stock to further compression to remove excess impregnating material therefrom.

4. Apparatus for impregnating cellular plant stock, including feed means to advance such stock, means to twist and to split the stock material while it is being advanced to increase the exposed surface area thereof, means applying a compressive force to the advancing stock to exhaust air and liquids therefrom, an expansion chamber receiving the compressed stock and substantially closed from communication with the atmosphere, said stock expanding in said chamber, and means to fill the voids in said expanding stock with liquid.

5. Apparatus according to claim 4, characterized by means in said chamber to break up or to separate stock compacted by the compression thereof into component chips and fibres for a more ready and uniform absorption of the liquid.

6. Apparatus according to claim 4, characterized in that said last named means comprises means holding a bath of impregnating liquid, said expanding plant stock being fed by said feed means through said expansion chamber into said bath.

7. Apparatus according to claim 4, characterized in that said last named means comprises a liquid inlet communicating with said expansion chamber to supply liquid to the plant stock immediately upon release of the compressive forces acting thereon.

8. Apparatus for impregnating cellular plant stock, including feed means to advance such stock, means to progressively compress the stock as it is advanced by said feed means, means holding a bath of an impregnating liquid into which the plant stock is advanced by said feed means, and an expansion chamber connected to said bath and said compressing means through which the stock is advanced to said liquid bath, said chamber communicating with said liquid bath beneath the surface thereof.

9. Apparatus according to claim 8, characterized by lift means to conduct the plant stock entering said bath upward and above the surface thereof to drain.

10. Apparatus for the continuous impregnating of cellular plant stock, including feed screw means operable continuously to advance said stock in a partly reduced form, a reduced diameter opening intermediate the ends of said feed screw means through which said stock is forced to exhaust air and liquid therefrom, another reduced diameter opening beyond the first said opening through which the stock is forced, the space between said openings constituting an expansion chamber substantially closed by compressed stock at said openings from communication with the atmosphere, and means to admit a liquid to said expansion chamber.

11. Apparatus for the continuous impregnating of cellular plant stock, including a cylindrical cage receiving the plant stock at one end thereof, a feed screw comprising a shaft and inclined flights thereon longitudinally disposed in said cage, rotation of said feed screw serving to advance the plant stock through said cage from said one end thereof toward the other end, a collar on said shaft cooperating with said cage to define at the location of the collar an annular passage of reduced area, and means immediately beyond said location in respect of the direction of travel of the plant stock for introducing into the cage controlled quantities of a liquid for absorption into the stock.

12. Apparatus according to claim 11, characterized by another collar on said shaft in longitudinally spaced relation to the first said collar and cooperating therewith and with said cage to define an expansion chamber into which the liquid is introduced and from which air substantially is excluded by plugs of stock material at the locations of said collars.

References Cited in the file of this patent

UNITED STATES PATENTS

| | | |
|---|---|---|
| 1,096,199 | Schuyler | May 12, 1914 |
| 1,773,771 | Anderson | Aug. 26, 1930 |
| 1,915,812 | Wollenberg | June 27, 1933 |
| 1,922,313 | Mason | Aug. 15, 1933 |
| 2,182,520 | Schwabe | Dec. 5, 1939 |
| 2,454,532 | Walter | Nov. 23, 1948 |
| 2,454,534 | Walter | Nov. 23, 1948 |
| 2,615,387 | Messing | Oct. 28, 1952 |
| 2,623,820 | Messing | Dec. 30, 1952 |
| 2,673,690 | Segl | Mar. 30, 1954 |
| 2,799,579 | Messing | July 16, 1957 |